UNITED STATES PATENT OFFICE.

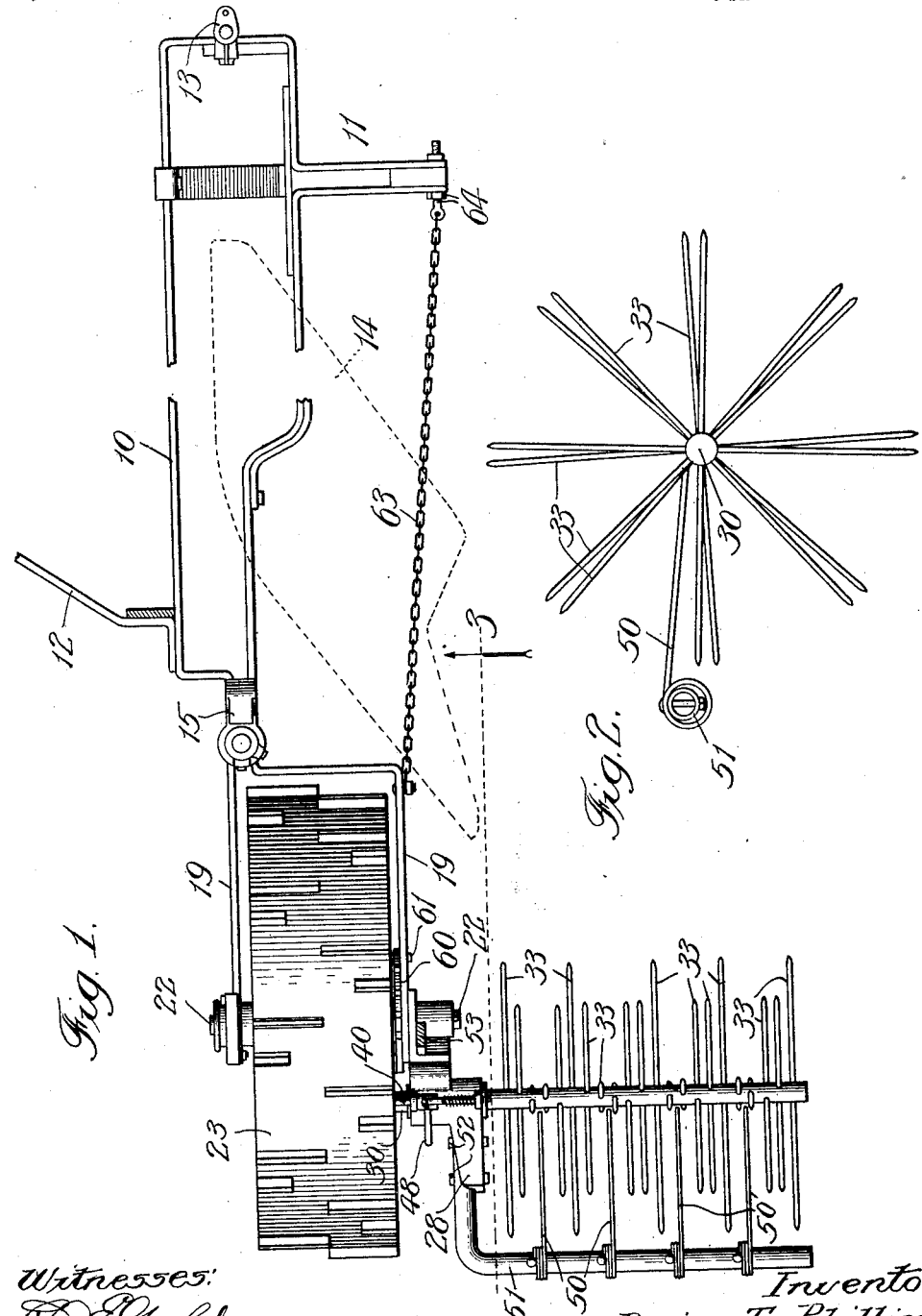

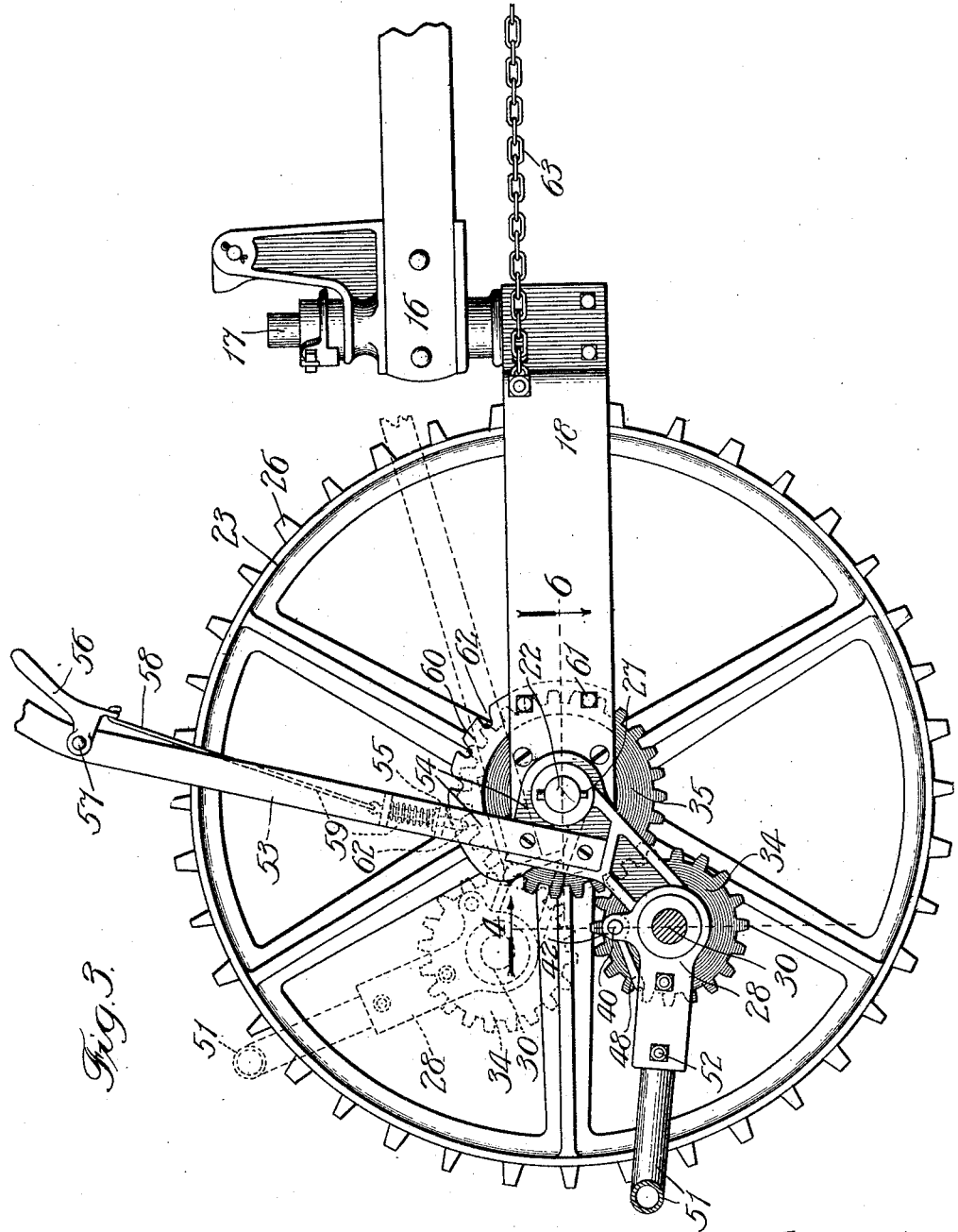

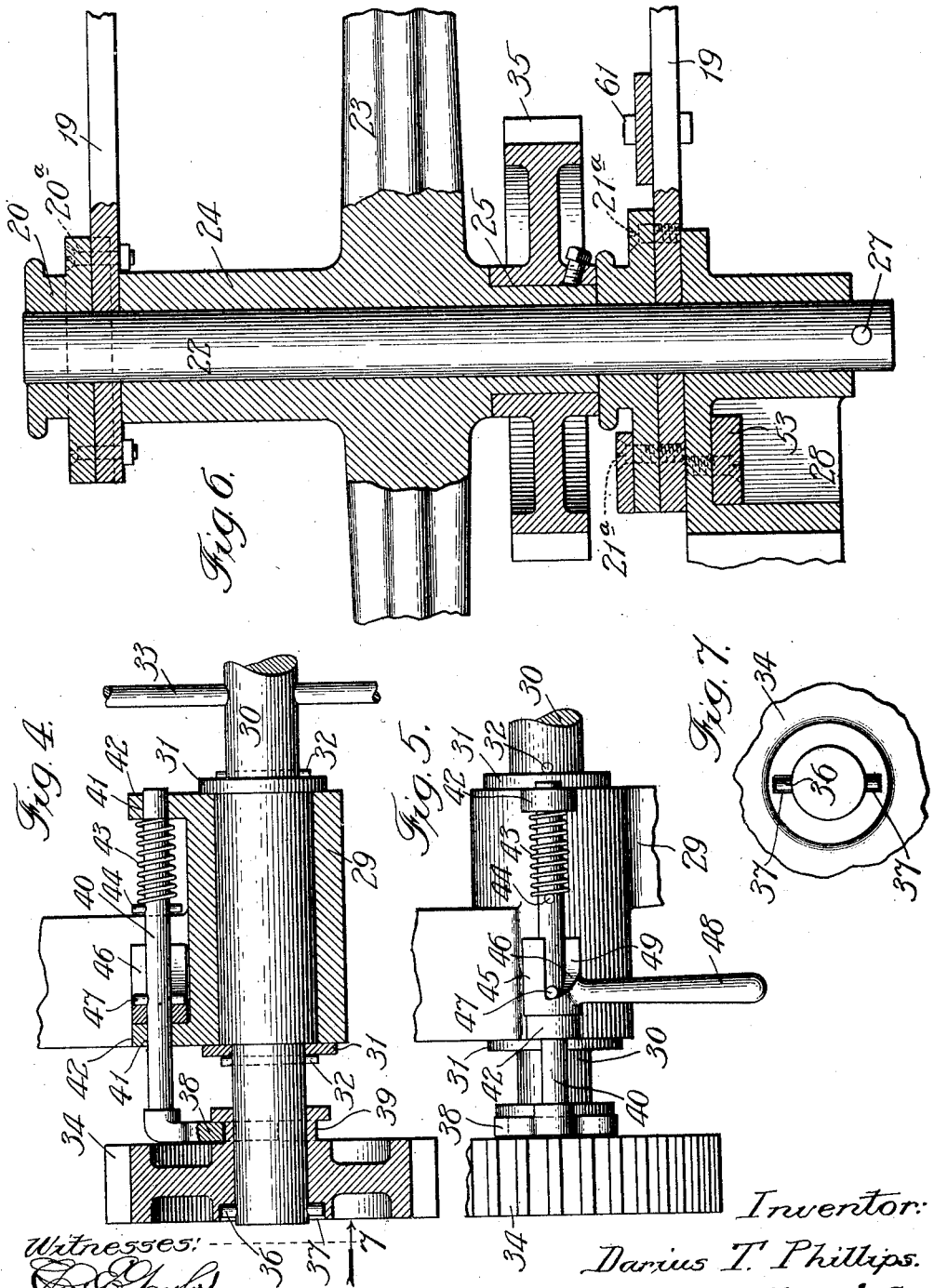

DARIUS T. PHILLIPS, OF CHICAGO, ILLINOIS.

AGRICULTURAL MACHINE.

1,112,091.

Specification of Letters Patent. Patented Sept. 29, 1914.

Application filed November 28, 1910. Serial No. 594,464.

*To all whom it may concern:*

Be it known that I, DARIUS T. PHILLIPS, a citizen of the United States, residing at Chicago, in the county of Cook and State of Illinois, have invented a new and useful Improvement in Agricultural Machines, of which the following is a specification.

My invention relates to attachments to be used in connection with plows, and, more especially, to attachments which will operate to pack the soil at the bottom of furrows produced by the action of the plow and pulverize and level the ground operated on by the plow.

It is well known that in the case of some kinds of soil it is highly advantageous to pack the sub-soil, namely that which lies beneath the ground displaced by the plow, in order that the moisture supplied to the ground be conserved. It is also well known that where the ground is left in ridges, the ridge-portion of the ground sometimes dries out too quickly, and too much moisture is allowed to remain in the furrow-portions of the ground.

Many attempts have been made to avoid the last referred to objection by employing scraping or harrowing devices, and in some cases so-called pulverizers, but from a practical standpoint these devices have been unsuccessful as the ground is left in an uneven condition presenting relatively large lumps of earth, which prevent the proper sowing of the seed and the loss of a relatively large proportion of the seed sown.

My objects, generally stated, are to provide mechanism which may be attached to a plow and which will operate to produce the desired pulverization and leveling of the ground, in order that it may be properly prepared for receiving the seed and preventing loss thereof by failure to germinate due to the stifling of it by large lumps of earth.

Another object is to provide means in connection with a plow which shall operate in furrows formed thereby to pack the soil in the bottom of the furrows, thereby producing a stratum of relatively compacted ground underlying the plowed portion thereof.

A still further object is to combine in connection with a plow sub-soil packing-means and pulverizing and leveling mechanism, whereby the operations of plowing, breaking up and leveling the ground may be produced by a single movement of the machine across a field; and other objects, generally stated, are to provide improvements generally in mechanism of the character referred to by which both time and labor in preparing a field for the receiving of the seed may be economized, loss from failure of germination of the seed reduced to the minimum, and the conservation of moisture in the ground be effected.

My improvements may be embodied in any form of sulky or engine-driven plows, but in order to simplify the illustration of my invention, I have shown it as forming an attachment to a single sulky plow, a description of the drawings of which is as follows:

Figure 1 is a plan view of a portion of a single-blade sulky plow equipped with my improvements, portions of the plow-frame being broken away and the forward wheels thereof omitted. Fig. 2 is a view in end elevation of the pulverizing devices forming a part of the construction illustrated in Fig. 1. Fig. 3 is an enlarged section taken at the line 3 on Fig. 1 and viewed in the direction of the arrow. Fig. 4 is an enlarged section taken at the line 4 on Fig. 3 and viewed in the direction of the arrow. Fig. 5 is a broken plan view of the construction illustrated in Fig. 4. Fig. 6 is an enlarged broken section taken at the line 6 on Fig. 3 and viewed in the direction of the arrow; and Fig. 7, an enlarged view in end elevation of one of the gear-members of the device, this view being taken as indicated by the line 7 on Fig. 4.

As my improved packing and pulverizing mechanism may be applied to plows of standard construction, I have shown it in connection with the frame of an ordinary single-blade draft plow.

In the drawings, the frame of the plow is represented at 10, the oppositely projecting extensions 11 and 12 of which, in practice, are connected with supporting wheels (not shown). The front end of the frame 10 is provided with a draft-device 13, and this frame carries a depending plow-share 14 illustrated diagrammatically. A rearwardly-projecting extension 15 of the frame 10 is provided, as is usual in plow-constructions, with a bearing 16 which, in the ordinary construction of plow, forms a support for the rear wheel (not shown) of the plow, but which, in the construction illustrated, receives the upwardly-extending vertical shaft 17 carried by the rearwardly-projecting frame 18 of my improved mechanism. The frame 18 comprises two side-members 19 connected together at their forward ends and with the shaft 17, whereby a pivotal connection between the frame 18 and plow-frame 10 is provided. The rear ends of the frame-members 19 are equipped with spaced annular members 20 and 21 secured thereto by screws 20$^a$ and 21$^a$ respectively, and confined in these frame-members 20 and 21 is a shaft 22. Journaled on this shaft is a wheel 23 provided with hub-sections 24 and 25, which fit between the member 21 and the opposite frame-member 19. The wheel 23, in the construction illustrated, is a traction-wheel provided on its periphery with transversely-extending ribs 26 for preventing slippage.

Journaled on one end of the shaft 22 and confined between one of the frame-members 19 and a pin 27 passing through the shaft, is a casting 28, in bearings 29 of which a rotary shaft 30 is journaled at one end, this shaft being held against longitudinal movement in the bearing 29 through the medium of washers 31 secured in position by pins 32 passing through the shaft 30. The shaft 30 is provided with devices adapted, when the machine is being moved along the ground, to penetrate the soil and move through it for pulverizing and leveling it, the shaft 30 being driven as hereinafter described. The devices for producing the pulverizing and leveling action may be of any suitable form, those shown comprising a plurality of rods 33 which extend through the shaft 30 and project beyond the opposite sides thereof as illustrated, adjacent ones of these rods being preferably disposed in angular relation to each other and staggered as clearly represented in Figs. 1 and 2.

In the construction illustrated, the shaft 30 is adapted to be either held stationary, rotated in the direction in which the machine is moved, or reversely rotated as desired, a description of the preferred construction of mechanism for effecting these results being as follows: Journaled on the end of the shaft 30 opposite to that carrying the rods 33 is a gear 34 which is adapted to mesh with a gear 35 rotatable with the wheel 33. The clutching of the gear 34 to the shaft 30 is effected through the medium of a pin 36 which extends on opposite sides of the shaft 30 and is adapted to fit into recesses 37 in a face of the gear 34. When the gear 34 is clutched to the shaft 30 as described, rotation of the wheel 23 operates to drive the shaft 30 in the opposite direction. To permit of the unclutching of the gear 34 from the shaft 30, I provide a device for shifting this gear on the shaft 30 to the right in Fig. 4 to disengage it from the pin 36, this gear-shifting device comprising a yoke 38 which embraces a peripherally grooved boss 39 rigid with the gear 34, a rod 40 connected with the yoke 38 and slidable through openings 41 in lugs 42 on the casting 28, and means for shifting the rod 40. The rod 40 normally forces the gear 34 to the left in Fig. 4 for engaging it with the pin 36, by means of a spring 43 surrounding the rod 40 and confined between one of the lugs 42 and a pin 44 fixed in the rod 40. The means for shifting the rod 40 to the right in Fig. 4 comprise a sleeve-member 45 surrounding the rod 40 and containing a cam-slot 46 into the base of which a pin 47 carried by the rod 40 extends when this slot registers with this pin. The member 45 carries an operating lever 48 through the medium of which the sleeve 45 may be turned upon the rod 40 to the right in Fig. 3 to cause the cam-surface 49 of the slot to ride against the pin 47 and thereby force the rod 40 to the right in Figs. 4 and 5 against the action of the spring 43, with the result of withdrawing the gear 34 from engagement with the pin 36. When the operator returns the sleeve 45 to the position illustrated in Fig. 5, the pin 47 enters the cam-slot 46 under the action of the spring 43, and the gear 34 engages with the pin 36 for clutching this gear to the shaft 30.

Coöperating with the pulverizing devices 33 are rods 50 carried by an arm 51 secured to the casting 28 as by bolts 52, this arm being of angle shape to cause its outer portion to extend parallel with the shaft 30. The rods 50, which are preferably of spring steel wound loosely about the arm 51 to produce the effect of a spiral spring-support, extend between pairs of the rods 33 and close to the rod 30 as indicated in Fig. 1.

As before stated, the casting 28 is journaled upon the shaft 22; this casting being supported in this manner for the purpose of permitting the pulverizing rods 33 to be adjusted up or down as desired, to regulate the extent of their protrusion into the ground, or entirely remove them from contact therewith, as desired. For effecting the adjustment stated and releasably securing the pulverizing mechanism in adjusted positions, I provide the casting 28 with a lever 53 which is secured to this casting as by screws 54. This lever carries a pawl 55 slidable longitudinally of the lever 53 through the medium of a lever 56 fulcrumed to the lever 53 as indicated at 57, and connected with the pawl as through the medium of a rod 58, this pawl being normally downwardly spring-pressed by a coil spring 59. The pawl 55 coöperates with a ratchet-device 60 which, in the construction shown, is in the form of a mutilated ring secured at its opposite ends to the adjacent frame-member 19 as by bolts 61 and the screws 21$^a$, the outer periphery of this ring containing a series of spaced notches 62 into any one of which the pawl 55 is adapted to extend. When the mechanism is positioned for causing the rods 33 to extend into the ground to a depth approximately equal to the depth of the furrows made by the plow, the pawl 55 will extend into the notch 62 farthest to the left in Fig. 3, and by adjusting the position of the lever to cause its pawl 55 to engage with the intermediate ones of the notches 62 the degree of penetration of the rods 33 may be regulated, and when the pawl 55 engages with the notch 62 farthest to the right in Fig. 3 the pulverizing device will be entirely removed from engagement with the ground and the parts thereof will extend into the positions illustrated by dotted lines in Fig. 3.

From the foregoing description it will be understood that as the plow is moved across a field in the direction of the arrow in Fig. 1, the wheel 23 will travel in the furrow made by the plow and pack down the soil, producing a hard bottom to the furrow. During this packing operation, the rod 30, assuming the gear 34 to be clutched thereto, is rotated in the opposite direction to that in which the plow is traveling, the rods traveling during the rotation of the shaft 30 through the soil from the rear toward the front of the plow, with the result of breaking up the soil and throwing lumps thereof upwardly and backwardly into engagement with the spring-rods 50, which latter, in combination with the adjacent ones of the rods 33, as the latter are moved toward these spring-rods operate to break up the lumps of material and thus reduce the ground to relatively fine condition, the action of the pulverizing mechanism as described operating to distribute the surface soil and reduce it to level condition. It will thus be understood that a field operated upon by my improved mechanism, in combination with a plow, will not only be plowed up and a substratum of hard ground at the bottom of the furrows be produced, but that the ground displaced by the plow will be pulverized and leveled. Where a single plow is used, making one furrow at a time, the wheel 23 will be caused to travel in each furrow and thus the packed stratum of ground referred to will be substantially co-extensive with the area of the field. The formation of a packed stratum co-extensive with the area of the ground surface is not necessary in order to produce good results where the soil requires packing of the ground below the surface, and thus where a plow is employed which operates to produce two parallel furrows at one time, but one of the wheels 23 may be employed for traveling in one of the furrows thus produced. It is desirable, however, that the area of the packed stratum be not less than approximately one-half of the entire area of the ground surface, and thus where a plow is used which produces more than two parallel furrows at one time, it is desirable that one wheel 23 be provided for each alternate furrow.

It will be understood from the foregoing that by adjusting the casting 28 upon the shaft 23 the rods 33 may be caused to penetrate the ground to any desired distance, and that when these rods are operating in the soil they will produce pulverization to a uniform depth throughout a field. The rods 50, which may be provided of a greater or less number than that illustrated, as conditions require, are preferably yielding in order to prevent rocks, carried up by the rods 33, from breaking either the stationary or traveling pulverizer rods, or clogging the machine.

While I prefer to drive the pulverizing mechanism in the opposite direction to that in which the plow travels, this is not indispensable so far as certain features of my invention are concerned. In some cases it might be desirable to permit the pulverizing mechanism to rotate in the direction traveled by the plow, in which case the rod 30 would be unclutched from the gear 34 as hereinbefore described, permitting this rod to freely rotate under the action of the rods 33 in moving through the ground, as the machine is advanced. Again, it might be desirable to hold the rod 30 against rotation as the plow is operating, in which case the rod should be unclutched from the gear 34 and any means provided for holding the shaft 30 stationary, as, for instance, a bar could be inserted between the rods 33 and beneath the rods 50, thus causing the device to operate as a drag or harrow. Where side-draft on the plow is excessive, it may be desirable to cause the wheel 23 to extend out of line with the plow, in order that the wheel may travel in the furrow. As the frame 19 connected with this wheel is pivotally connected with the frame 10, it may be allowed to travel out of line as described, the means illustrated for holding the wheel to a certain line of travel, whether it be in line with the plow or out of line therewith, comprising a chain 63 secured at one end to one of the frame-members 19 and at its opposite end to the member 11 through the medium of an adjustable bolt 64. As the tendency of the ground-packing and pulverizing attachment is to swing at its pivotal connection with the frame 10 out of line with the plow, it will be manifest that by adjusting the device 64 to lengthen or shorten the cable 63 as desired, resistance to the turning motion referred to is produced and the frame 19 will extend in a position to hold the cable 63 taut, thus insuring the traveling of the wheel 23 in line with the plow, or out of line therewith, as desired.

While I have illustrated and described my pulverizing mechanism as driven from the wheel 23, it will be readily understood that it may be driven from any other source when it is to be positively actuated, and, furthermore, if used as an attachment to an engine-plow could either be driven from the traction-wheels thereof or directly from the engine. Furthermore, while I have illustrated and described rods 33 as the devices for producing the pulverizing action, I do not wish to be understood as intending to limit my invention to the use of rods, as any other form of pulverizing device may be employed.

What I claim as new, and desire to secure by Letters Patent, is—

1. Pulverizing mechanism for the purpose set forth comprising, in combination, a wheeled support, a shaft journaled on said support and provided with laterally-projecting rods spaced apart, a bar carried by said support and extending substantially parallel with said shaft in the rear of the axis of the latter, rods of spring metal coiled loosely about said bar to present spring-sections with the outer ends of said yielding rods projecting into the spaces between the rods on said shaft, and means for rotating said shaft in the direction opposite to that in which the wheel of the support rotates when the latter is moved over the ground, whereby the lumps of dirt engaged by said first-named rods are raised thereby and fall upon said stationary rods and are broken up by the coöperating stationary and movable rods.

2. A combined sub-soil packer and pulverizing device for attachment to a plow, comprising a frame interchangeable with the usual wheeled frame of the plow, a wheel on said supplemental frame positioned to travel in the furrow made by the plow and pack the soil at the bottom of the furrow, a shaft journaled on said frame and extending laterally thereof and provided with laterally-extending rods spaced apart, a bar carried by said supplemental frame extending in the rear of the axis upon which said shaft rotates and substantially parallel therewith, yielding rods carried by said bar and extending into the spaces between the rods on said shaft, and means for rotating said shaft in the direction opposite to that in which said wheel rotates when the wheel is moved over the ground, whereby the lumps of dirt engaged by said first-named rods are raised and fall upon said yielding rods and are broken up by the coöperating rods on said shaft.

DARIUS T. PHILLIPS.

In presence of—
A. U. THORIEN,
R. A. SCHAEFER.

---

Copies of this patent may be obtained for five cents each, by addressing the "Commissioner of Patents, Washington, D. C."